United States Patent [19]

Szeverenyi et al.

[11] 3,813,629

[45] May 28, 1974

[54] TEMPERATURE COMPENSATED FLUID LEVEL SENSOR

[75] Inventors: Nikolaus A. Szeverenyi; David F. Thompson, both of Warren, Pa.

[73] Assignee: GTE Sylvania Incorporated, Seneca Falls, N.Y.

[22] Filed: Jan. 5, 1973

[21] Appl. No.: 321,133

[52] U.S. Cl. ............... 337/324, 340/244 R, 337/327
[51] Int. Cl. ............................................. G08b 21/00
[58] Field of Search ................... 339/380, 112, 324; 340/244 R

[56] References Cited
UNITED STATES PATENTS

| | | | |
|---|---|---|---|
| 2,250,438 | 7/1941 | Persons | 337/324 |
| 2,463,891 | 3/1949 | Malone | 337/380 |
| 3,171,934 | 3/1965 | Brennan | 337/380 |

*Primary Examiner*—Thomas B. Habecker
*Attorney, Agent, or Firm*—Norman J. O'Malley; Donald R. Castle; William H. McNeill

[57] ABSTRACT

There is described an apparatus for detecting the presence or absence of fluid. The apparatus comprises an electrical circuit and a sensor device electrically joined to the circuit. The sensor device comprises a housing member defining a first chamber, a tip member secured to the housing and forming a second chamber adjacent said first chamber, a diaphragm member forming a common closure for both chambers, heating means within the second chamber, a first contact within the first chamber, and a second contact affixed to the diaphragm also within the first chamber. This second contact is adapted for engaging the first contact when the temperature difference between the two chambers exceeds a predetermined level.

8 Claims, 4 Drawing Figures

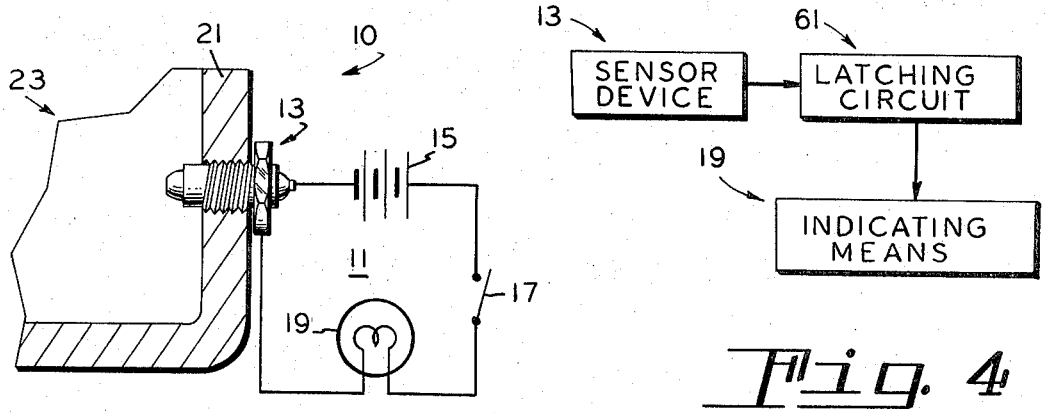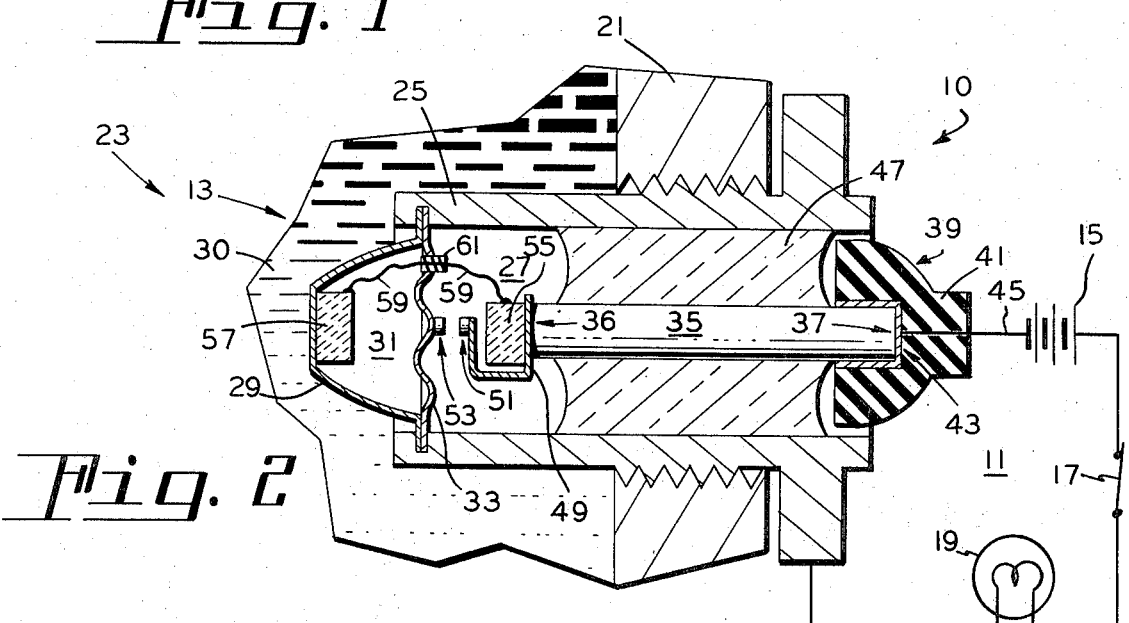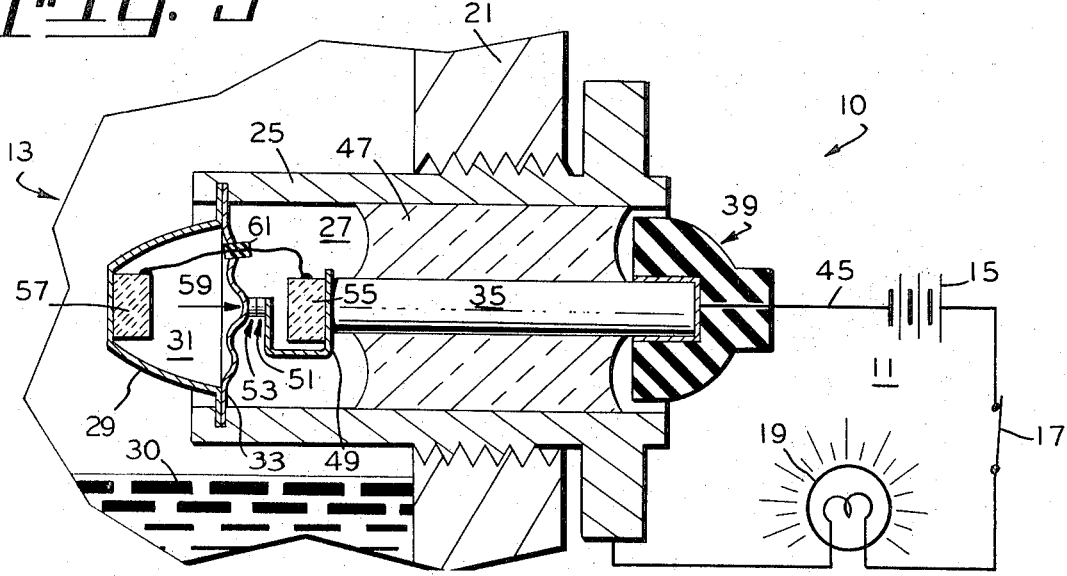

TEMPERATURE COMPENSATED FLUID LEVEL SENSOR

CROSS REFERENCE TO COPENDING APPLICATIONS

There is disclosed in copending application Ser. No. 236,148, titled "Temperature Compensated Fluid Level Sensor" and assigned to the same assignee as the present application, a fluid level sensor which utilizes a pair of heat responsive means which engage when the temperature difference between the spaced apart portions of a heater means exceeds a predetermined level.

There is disclosed in another copending application Ser. No. 236,149, titled "Fluid Level Sensor" and assigned to the same assignee as the present application, a fluid level sensor which utilizes a single heat responsive means which engages the first spaced apart portion of a heater means when the temperature surrounding the heat responsive means exceeds a predetermined level.

In the present application, a sensor device is disclosed which utilizes a pair of pressure sensitive chambers with a heater means located within one of these chambers. Should the temperature difference between the described chamber exceed a predetermined level, a pair of individual contact members will become mutually engaged.

BACKGROUND OF THE INVENTION

This invention relates to fluid sensing apparatus and more particularly to an apparatus for providing a signal indication upon detecting either the presence or absence of fluid.

Previously known methods for detecting the presence or absence of fluid have ranged from mechanically operated floats to probing devices requiring elaborate electronic circuitry. A particular shortcoming to many devices of the former varieties have been the inability to compensate for changes in temperature of the fluids being measured. Those devices which are able to most usually require extensive electronic circuitry which in turn adds to the complexity of operation as well as the possibility for failure during operation. Additionally, such circuitry adds appreciably to the cost for producing such devices.

Accordingly, it is believed that a device which detects the presence or absence of fluid while compensating for varying temperatures of the fluid as well as being relatively simple in operation and inexpensive to manufacture would constitute an advancement in the art.

OBJECTS AND SUMMARY OF THE INVENTION

Therefore, it is a primary object of this invention to provide a fluid sensing apparatus which includes a means for compensating for varying temperatures of the fluid being detected.

It is a further object of this invention to provide a sensing apparatus which operates in a relatively simple manner and is relatively inexpensive to manufacture.

In accordance with one aspect of this invention, there is provided an apparatus for detecting the presence or absence of fluid. This apparatus comprises an electrical circuit and a sensor device comprising a housing member having a tip member secured thereto. Within the housing is a first chamber and within the tip is a second chamber. A diaphragm member, secured to the housing, forms a common closure for both chambers. The apparatus also comprises a means for heating the second chamber, a first contact member within the first chamber and a second contact member affixed to the diaphragm within the first chamber. When the temperature difference between the two chambers exceeds a predetermined level, both contacts engage providing increased electrical current to the circuit. BRIEF DESCRIPTION OF THE DRAWINGS FIG. 1 is a side elevational view of one embodiment of the present invention.

FIGS. 2 and 3 are enlarged views of various phases of operation of the sensor of FIG. 1.

FIG. 4 is a block diagram of a circuit utilizing a latching means.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

In FIG. 1, one embodiment of a fluid level detecting apparatus 10 in accordance with the invention is illustrated and shown to comprise an electrical circuit 11 and a sensor device 13. Circuit 11 comprises a potential source illustrated as a battery 15, a switching means 17 for opening and closing circuit 11, and a current indicating means, illustrated as bulb 19. Sensor device 13 is electronically connected to circuit 11 and is shown to be positioned within a wall 21 of a fluid holding container 23. Although the particular method illustrated for positioning sensor 13 is to place the device in the side of container 23, it may also be placed in either the top or bottom, depending on the level of the fluid to be measured or the configuration of the container. Furthermore, although the method shown for retaining sensor 13 in wall 21 is by screw threads (the sensor being provided with external screw threads to mate with corresponding threads in wall 21), several other methods for retention are possible, two examples being welding and soldering. The method illustrated is preferred, however, because it provides for relative ease of removal of device 13 from container 23 in the event of damage to either the sensor or container.

In FIGS. 2 and 3, there are shown the various phases of operation of apparatus 10. More especially, in FIG. 2 the positions of various components within device 13 are illustrated when the device is exposed to fluid within the container while in FIG. 3, these positions are shown when the fluid level has dropped substantially below device 13. Accordingly, sensor device 13 is shown to comprise a housing member 25 of both electrically and thermally conductive material and defining a first chamber 27. A tip member 29 is secured to housing 25 and forms a second chamber 31 adjacent first chamber 27. Tip 29, adapted for being subjected to fluid 30 within container 23, is preferred to be of a material sold under the trade name "Rodar" and manufactured by the W. B. Driver Company of Newark, New Jersey, a subsidiary of the assignee of the present invention. "Rodar", consisting essentially of about 29 percent by weight nickel, 17 percent by weight cobalt, and the remainder iron, is a suitable electrical conductor and possesses the additional property of relatively low thermal conductivity. The additional property, as will be explained, is highly desirable to enhance the functioning characteristics of sensor device 13.

A diaphragm member 33 is also secured to housing 25 and forms a common closure for first and second chambers 27 and 31 respectively. Diaphragm 33 is preferred to be of a metallic material possessing good electrical conductivity properties, such as copper. Positioned within housing 25 is a thermally conductive member 35 which has one end 36 exiting into first chamber 27 and a second opposing end 37 exiting into the environment surrounding container 23. As illustrated, sensor device 13 is adapted for connecting to circuit 11 via plug 39 which engages thermal member 35 at end 37. Plug 39 is illustrated as comprising a body of insulative material 41 about a metallic socket 43 which in turn is connected to conducting wire 45. Plug 39, as can be understood, is but one of several means possible for interconnecting device 13 and circuit 11 and is not meant as the sole method to which the present invention is limited. Other connecting means, including a common alligator clip or even a single wire soldered to end 37, are possible. In the event that the environment surrounding container 23 is not favorable for exposed electrical connections, plug 39 could easily include an insulating cap which encompasses the entire external portion of housing 25. Thermally conductive member 35 is preferably encapsulated within an electrically insulative material 47 possessing good thermal conductive properties, such as glass. Affixed to end 36 of thermal member 35 is a substantially u-shaped metallic clip 49 which has one side thereof substantially abutting end 36, as illustrated. Affixed to the opposing side of clip 49 is a first contact member 51. Contact 51 is preferably metallic in nature, thereby possessing good electrical conduction properties. An even more preferred material for contact 51 would be any one of the noble metals, such as gold or silver.

Attached to the first chamber side of diaphragm member 33 is second contact member 53 which is also preferably of the better electrically conductive metallic materials, such as gold or silver.

A means for heating first chamber 27 is positioned on one side of clip 49 within first chamber 27 and is illustrated as an electrically resistive element 55. As is typical of most electrical resistors, when electrical current is passed therethrough, heat is generated. Virtually all such resistive materials exhibit this characteristic and are therefore suitable for the material for heating means 55. Similarly, another heating means 57 is provided, this time within second chamber 31 and is adapted for heating this chamber. Once again, the material for heating means 57 may be chosen from any of several materials used in electrical resistors. Interconnecting the two resistive elements 55 and 57 is wire 59 which is attached at each end to one of the elements by any of several conventional methods, preferably soldering. Wire 59 passes through diaphragm 33 and is insulated electrically therefrom by insulator plug 61 which may be of rubber or similar material. It is preferred that wire 59 be of a good electrically conductive material, such as copper.

As previously described, one end of circuit 11 is electrically joined to sensor device 13 via plug 39. The other end of circuit 11 can be joined at either housing 25, as illustrated, or to container wall 21 if the container is of a material possessing good electrical conducting properties.

To explain the operation of apparatus 10, particular reference is made to both FIGS. 2 and 3. In FIG. 2, tip member 29 is shown as being subjected to fluid 30 within container 23. With switch 17 closed and tip 29 immersed in fluid 30, electrical current flows in the following path: battery 15, conducting wire 45, thermal member 35, clip 49, resistive element 55, wire 59, resistive element 57, tip member 29, housing 25, indicating means 19, through switch 17, and back to battery 15. Because the electrical current must pass through the two resistive elements, it is at a level insufficient to actuate bulb 19. Assuring that bulb 19 will not light under these conditions is readily accomplished by proper selection of corresponding elements in the sensor and circuit. One example of a workable circuit is to use a 12 volt battery connected to a bulb having a resistance of approximately 1 ohm. When using this combination, the desired resistance for each of elements 55 and 57 is about two hundred ohms. The combined resistance of other elements in sensor 13, including housing 25, thermal member 35, clip 49, wire 59, and tip 29 is minimal and can be considered as substantially zero.

Electrical current through resistive elements 55 and 57 cause each to become warm as is the case for almost all electrical resistors. The resulting heat from element 55 dissipates into first chamber 27 and thermal member 35 (via u-shaped clip 49). That heat which enters thermal member 35 is further dissipated into insulative material 47 and eventually into container wall 21. As can be appreciated, some of this heat will exit sensor device 13 at the plug end of the device and dissipate into the surrounding environment. The heat generated by resistive element 57 dissipates into second chamber 31 and into tip member 29, where it further escapes into fluid 30 surrounding the tip. Provided tip member 29 remains subjected to the fluid, the heat created within electrically resistive elements 55 and 57 dissipates at substantially equal rates in the opposing paths previously described. However, when the fluid level drops below tip 29, as illustrated in FIG. 3, an imbalance to the above-described rates of dissipation is created. This imbalance occurs primarily because the fluid which previously acted as a heat sink for much of the heat generated within element 57 is now absent. To further assure this imbalance, which is the key to the successful operation of apparatus 10, it is preferred that the overall volume of thermal member 35 be substantially greater than the overall volume of tip member 29. It is also preferred that the coefficient of thermal conductivity for thermal member 35 be greater than that of tip 29, but this is not necessarily required provided the previously described differences in volume exists. In the particular embodiment, the Rodar tip has a coefficient of thermal conductivity of approximately 12.0 BTU/(hr.) (sq. ft.) (°F per ft.)

As described, the absence of fluid now causes resistive element 57 to become substantially warmer than element 55. This difference in turn causes the temperature within second chamber 31 to become substantially greater than that within first chamber 27. As a result, the expansivity of second chamber 31 is greater than that of first chamber 27 thereby causing diaphragm member 33 to be moved in the direction shown. As a result of the movement by diaphragm 33, first and second contacts 51 and 53 thereby engage (shown in FIG.

3). Accordingly, a new circuit is provided and comprises the following path: battery 15, wire 45, thermal member 35, u-shaped clip 49, first contact 51, second contact 53, diaphragm member 33, housing 25, current indicating means 19, switch 17, and back to battery 15. As can be appreciated, the new circuit has now eliminated the need for current to pass through resistive elements 55 and 57. As a result, the current within the new circuit is substantially greater than the previously described circuit including elements 55 and 57 and current indicating means 19 is now actuated (as illustrated in FIG. 3).

The sensor device as shown is unique in another feature in that it provides a means whereby bulb 19 is sequentially actuated when fluid level drops. This is achieved when the electrical current by-passing elements 55 and 57 passes through contacts 51 and 53 for a sufficient period to allow these elements to cool. This in turn permits the temperatures of the corresponding chambers 27 and 31 to lower and as a result, diaphragm 33 will return to its approximate original position. Contacts 51 and 53 are therefore disengaged, and the electrical current must once again pass through elements 55 and 57. Accordingly, the current level drops substantially and bulb 19 does not light. After a relatively short period of time, elements 55 and 57 again heat up, diaphragm 33 is again displaced, and bulb 19 again lights. If desired, however, a steady electrical signal can be provided to indicating means 19 by use of an electrical or mechanical latching circuit or device which latches on to energize bulb 19 continuously after the first engagement of contacts 51 and 53. Such latching circuits or devices can include an SCR, latching relay, or similar circuits and devices. An example of such an arrangement is illustrated in FIG. 4 in which the signal from sensor 13 actuates latching circuit 61, which in turn provides a steady electrical signal to indicating means 19.

In addition to providing means whereby a visual indication is given when the fluid within container 23 is below a certain level, apparatus 10 can be modified to perform other functions by relatively simple alterations to circuit 11, such as energizing other circuits or operating other mechanisms such as audible signals, valving arrangements, or the like. For example, circuit 11 can be modified to include a means for actuating a valving mechanism in a boiler to thereby either shut down a burner or open a valve and permit more fluid to enter the container, depending on the pre-established fluid level setting.

Another truly unique feature of sensor device 13 is its ability to operate in fluids having a wide variety of temperatures. Regardless of the temperature of the fluid being detected, device 13 will not provide an increase in current flow to bulb 19. This is accomplished because both first and second chambers 27 and 31, having approximate equally comparative volumes, will expand accordingly at the same rate when device 13 is subjected to varying temperatures. This results in substantially equal pressures being exerted against both sides of diaphragm 33, thereby assuring that it will not be significantly moved.

As a result of the above described unique feature, apparatus 10 may be used in a multiple of situations in which the fluids to be detected vary in temperature throughout their operation. Primary examples of such situations are found in the several containers for fluids utilized in the operation of automobiles. Sensor device 13 could easily be inserted into an automobile's brake fluid housing, radiator side wall, or the various housings for the transmission fluid, engine oil, power steering fluid, differential fluid, or possibly the windshield washer fluid, with the automobile's electrical circuitry readily able to substitute for circuit 11.

It is also understood that sensor device 13 can easily be modified and still function satisfactorily. For example, utilization of thermal member 35 is not entirely necessary in that this member could easily be removed from the device. In this event, u-shaped clip could be arranged differently so that it could be more directly connected to battery 15. Additionally, electrical resistive element 55 could be removed entirely from first chamber 27 and resistive element 57 adjusted accordingly. In this event, wire 59 would be directly joined from element 57 to clip 49, or thermal member 35 if employed.

Still further modifications could include altering the configuration for tip member 29 to thereby permit an increased or decreased rate of heat removal from element 57. A flange or similar article of substantially similar material could be attached thereto to effect such an increase.

Thus, there has been provided an apparatus for detecting the presence or absence of fluid. Unique features of this apparatus, which include temperature compensation means for varying fluid temperatures and sequentially actuated current indicating means have also been provided.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensor device comprising:
    a housing member defining a first chamber;
    a tip member secured to said housing and forming a second chamber adjacent said first chamber, said tip member adapted for being exposed to a fluid and for preventing entrance of said fluid into said second chamber;
    a diaphram member secured to said housing and forming a common closure for said first and second chambers;
    heater means within said second chamber in heat conductive relationship to said tip member;
    a first contact member within said first chamber, and a second contact member affixed to said diaphram within said first chamber for engaging said first contact member when the temperature difference between said first and second chambers exceeds a predetermined level.

2. The sensor device according to claim 1 including a heater means for heating said first chamber.

3. The sensor according to claim 1 including a thermally conductive member within said first chamber.

4. The sensor device according to claim 1 wherein said heater means within said second chamber is an electrical resistive element.

5. The sensor device according to claim 2 wherein said heater means within said first chamber is an electrically resistive element.

6. The sensor device according to claim 3 wherein said thermally conductive member is electrically conductive.

7. The sensor device according to claim 1 wherein said tip member is electrically conductive.

8. The sensor device according to claim 1 wherein said diaphram member secured to said housing is electrically conductive.

* * * * *